(12) United States Patent
Gokmen et al.

(10) Patent No.: US 10,373,051 B2
(45) Date of Patent: Aug. 6, 2019

(54) RESISTIVE PROCESSING UNIT

(71) Applicant: International Business Machines Corporation, Armonk, NY (US)

(72) Inventors: Tayfun Gokmen, Braircliff Manor, NY (US); Seyoung Kim, White Plains, NY (US); Yurii A. Vlasov, Katonah, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 830 days.

(21) Appl. No.: 14/966,394

(22) Filed: Dec. 11, 2015

(65) Prior Publication Data

US 2017/0109626 A1 Apr. 20, 2017

Related U.S. Application Data

(63) Continuation of application No. 14/887,564, filed on Oct. 20, 2015.

(51) Int. Cl.
*G06N 3/04* (2006.01)
*G06N 3/08* (2006.01)
*G06N 3/063* (2006.01)

(52) U.S. Cl.
CPC ............ *G06N 3/08* (2013.01); *G06N 3/0472* (2013.01); *G06N 3/0635* (2013.01); *G06N 3/084* (2013.01)

(58) Field of Classification Search
USPC .......................................................... 706/25
See application file for complete search history.

(56) References Cited

U.S. PATENT DOCUMENTS

| | | | |
|---|---|---|---|
| 9,041,389 B2 * | 5/2015 | Gokmen | F04D 11/00 324/251 |
| 9,389,273 B2 * | 7/2016 | Gokmen | H02S 50/10 |
| 9,400,306 B2 * | 7/2016 | Gokmen | H02S 50/10 |
| 9,443,997 B2 * | 9/2016 | Gokmen | H01L 31/0326 |
| 9,601,546 B1 * | 3/2017 | Ando | H01L 27/2463 |
| 9,608,160 B1 * | 3/2017 | Bayram | H01S 5/34333 |

(Continued)

OTHER PUBLICATIONS

NANO Letters Nanoscale Memristor Device as Synapse in Neuromorphic Systems, Sung Hyun Jo, Ting Chang, Idongesit Ebong, Bhavitavya B. Bhadviya, Pinaki Mazumder, and Wei Lu Department of Electrical Engineering and Computer Science, University of Michigan, Michigan 48109 pp. 1297-1301.*

(Continued)

*Primary Examiner* — Michael B Holmes
(74) *Attorney, Agent, or Firm* — Cantor Colburn LLP; Vazken Alexanian

(57) ABSTRACT

Embodiments are directed to a two-terminal resistive processing unit (RPU) having a first terminal, a second terminal and an active region. The active region effects a non-linear change in a conduction state of the active region based on at least one first encoded signal applied to the first terminal and at least one second encoded signal applied to the second terminal. The active region is configured to locally perform a data storage operation of a training methodology based at least in part on the non-linear change in the conduction state. The active region is further configured to locally perform a data processing operation of the training methodology based at least in part on the non-linear change in the conduction state.

9 Claims, 16 Drawing Sheets f(x) = f (INPUT 1 * CONNECTION STRENGTH 1 + INPUT 2 * CONNECTION STRENGTH 2)

(56) References Cited

U.S. PATENT DOCUMENTS

| | | | | |
|---|---|---|---|---|
| 9,646,243 | B1* | 5/2017 | Gokmen | G06N 3/0635 |
| 9,715,656 | B1* | 7/2017 | Gokmen | G06N 3/08 |
| 9,779,355 | B1* | 10/2017 | Leobandung | G06N 3/084 |
| 9,852,790 | B1* | 12/2017 | Gokmen | G11C 13/0007 |
| 9,887,351 | B1* | 2/2018 | Ando | H01L 45/1608 |
| 9,997,704 | B2* | 6/2018 | Ando | H01L 27/2463 |
| 10,079,341 | B1* | 9/2018 | Bedell | H01L 48/08 |
| 10,096,773 | B1* | 10/2018 | Ando | H01L 45/1233 |
| 10,115,800 | B1* | 10/2018 | Kim | H01L 21/02112 |
| 10,141,509 | B2* | 11/2018 | Ando | H01L 45/1233 |
| 10,153,159 | B1* | 12/2018 | Kim | H01L 29/78 |
| 10,186,657 | B2* | 1/2019 | Brew | H01L 45/1206 |

OTHER PUBLICATIONS

Nature communications Pattern classification by memristive crossbar circuits using ex situ and in situ training Fabien Alibart, Elham Zamanidoost & Dmitri B. Strukov | Accepted May 29, 2013 | Published Jun. 25, 2013 pp. 1-7.*

Frontiers in neuroscience Acceleration of Deep Neural Network Training with Resistive Cross-Point Devices:DesignConsiderations Tayfun Gokmen and YuriiVlasov IBM T.J. WatsonResearchCenter,YorktownHeights,NY,USA Front. Neurosci., Jul. 21, 2016 pp. 1-13.*

NANO Letters Nanoscale Memristor Device as Synapse in Neuromorphic Systems Sung Hyun Jo, Ting Chang, Idongesit Ebong, Bhavitavya B. Bhadviya, Pinaki Mazumder, and Wei Lu, Nano Lett. 2010, 10, pp. 1297-1301.*

ScienceDirect Elsevier Neurocomputing vol. 74, Issues 1-3, Dec. 2010, pp. 239-255 Artificial neural networks in hardware: A survey of two decades of progress Janardan Misra, Indranil Saha.*

IEEE Xplore a CMOS Spiking Neuron for Brain-Inspired Neural Networks With Resistive Synapses andIn SituLearning Published in : IEEE Transactions on Circuits and Systems II: Express Briefs ( vol. 62 , Issue: 11 , Nov. 2015 ) Xinyu Wu; Vishal Saxena; Kehan Zhu; Sakkarapani Balagopa pp. 1088-1092 IEEE.*

List of IBM Patents or Patent Applications Treated as Related; (Appendix P), Filed Dec. 11, 2015; 2 pages.

Tayfun Gokmen et al., "Resistive Processing Unit", U.S. Appl. No. 14/887,564, filed Oct. 20, 2015.

Tayfun Gokmen, "Convolutional Neural Networks Using Resistive Processing Unit Array", U.S. Appl. No. 15/262,606, filed Sep. 12, 2016.

Tayfun Gokmen, "Killing Asymmetric Resistive Processing Units for Neural Network Training", U.S. Appl. No. 15/262,582, filed Sep. 12, 2016.

* cited by examiner f(x) = f (INPUT 1 * CONNECTION STRENGTH 1 + INPUT 2 * CONNECTION STRENGTH 2)

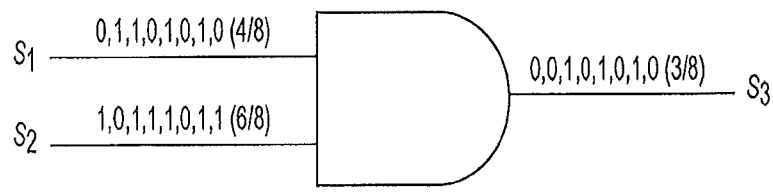
FIG. 5
$$i = g(s,v)v \quad \text{EQUATION [1]}$$
$$\frac{\partial s(t)}{\partial t} = f(s,v) \quad \text{EQUATION [2]}$$
FIG. 6
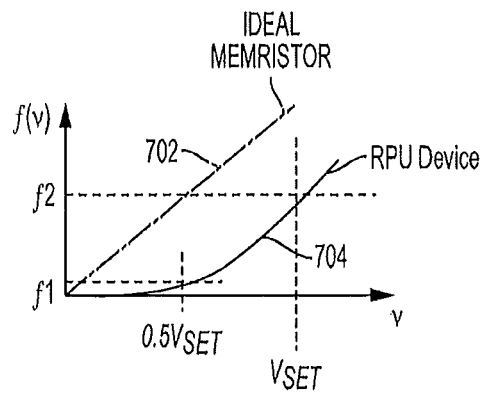
FIG. 7

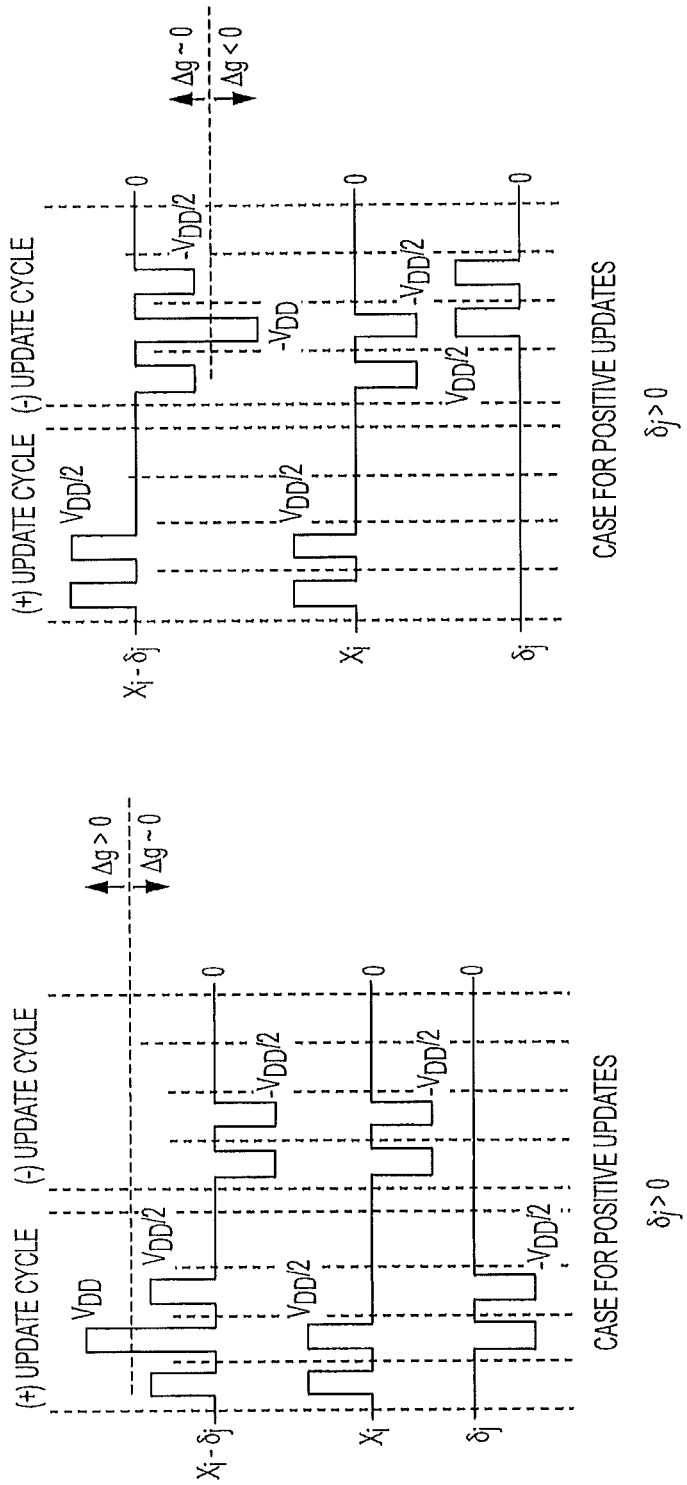

VOLTAGE HEIGHT MODULATION FOR LOCAL MULTIPLICATION - CONTINUED

THE FIRST TWO TERMS OF THE TAYLOR EXPANSION GIVES THE FOLLOWING RESULTS

EXPONENTIAL FUNCTION:

$$e^x = \sum_{n=0}^{\infty} \frac{x^n}{n!} = 1 + x + \frac{x^2}{2!} + \frac{x^3}{3!} + \ldots \text{ FOR ALL } x$$

$$\Delta w = (e^{x+\delta} - 1) - (e^x - 1) - (e^\delta - 1)$$

$$\Delta w = (1 + (x+\delta) + \frac{(x+\delta)^2}{2} - 1) - (1 + (x) + \frac{(x)^2}{2} - 1) - (1 + (\delta) + \frac{(\delta)^2}{2} - 1)$$

ABOVE EQUATION SIMPLIFIES TO $\boxed{\Delta w = x\delta}$

THIS DEMONSTRATES THAT THE HIGHER ORDER TERMS DO NOT MATTER, AND THE DISCLOSED UPDATE METHODOLOGIES WORK AS WELL AS THE PERFECT MULTIPLICATION CASE AS SHOWN ON THE DIAGRAM TO THE RIGHT

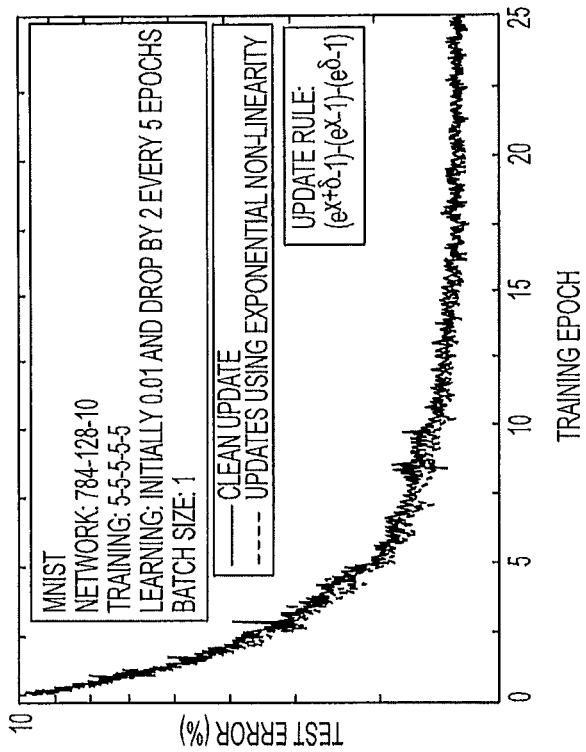

FIG. 15

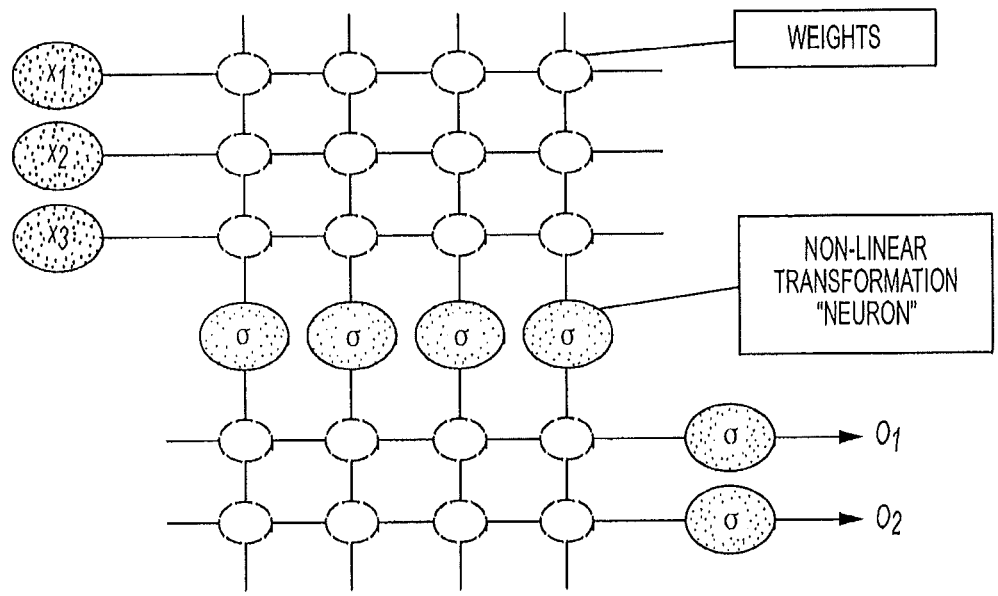
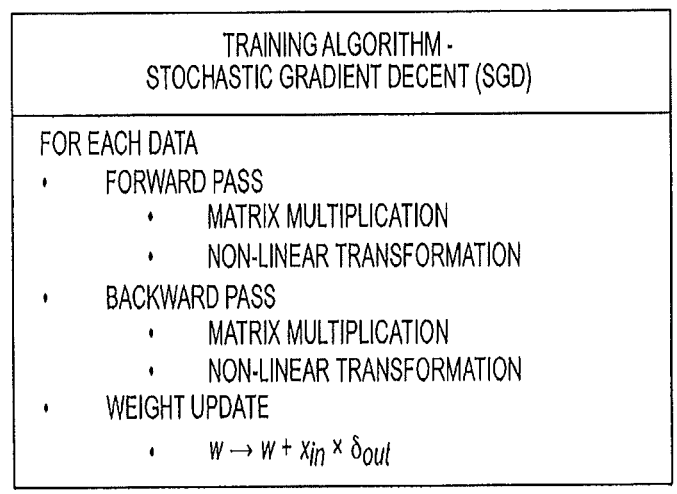
FIG. 16

RESISTIVE PROCESSING UNIT

DOMESTIC PRIORITY

The present application claims priority to U.S. Nonprovisional application Ser. No. 14/887,564 filed on Oct. 20, 2015 titled "RESISTIVE PROCESSING UNIT," assigned to the assignee hereof and expressly incorporated by reference herein.

BACKGROUND

The present disclosure relates in general to novel configurations of trainable resistive crosspoint devices, which are referred to herein as resistive processing units (RPUs). More specifically, the present disclosure relates to artificial neural networks (ANNs) formed from crossbar arrays of two-terminal RPUs that provide local data storage and local data processing without the need for additional processing elements beyond the two-terminal RPU, thereby accelerating the ANN's ability to learn and implement algorithms such as online neural network training, matrix inversion, matrix decomposition and the like.

"Machine learning" is used to broadly describe a primary function of electronic systems that learn from data. In machine learning and cognitive science, ANNs are a family of statistical learning models inspired by the biological neural networks of animals, and in particular the brain. ANNs may be used to estimate or approximate systems and functions that depend on a large number of inputs and are generally unknown.

ANNs are often embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons which may be activated by the pixels of an input image. After being weighted and transformed by a function determined by the network's designer, the activations of these input neurons are then passed to other downstream neurons, which are often referred to as "hidden" neurons. This process is repeated until an output neuron is activated. The activated output neuron determines which character was read.

Crossbar arrays, also known as crosspoint arrays or crosswire arrays, are high density, low cost circuit architectures used to form a variety of electronic circuits and devices, including ANN architectures, neuromorphic microchips and ultra-high density nonvolatile memory. A basic crossbar array configuration includes a set of conductive row wires and a set of conductive column wires formed to intersect the set of conductive row wires. The intersections between the two sets of wires are separated by so-called crosspoint devices, which may be formed from thin film material.

Crosspoint devices, in effect, function as the ANN's weighted connections between neurons. Nanoscale two-terminal devices, for example memristors having "ideal" conduction state switching characteristics, are often used as the crosspoint devices in order to emulate synaptic plasticity with high energy efficiency. The conduction state (e.g., resistance) of the ideal memristor material may be altered by controlling the voltages applied between individual wires of the row and column wires. Digital data may be stored by alteration of the memristor material's conduction state at the intersection to achieve a high conduction state or a low conduction state. The memristor material can also be programmed to maintain two or more distinct conduction states by selectively setting the conduction state of the material. The conduction state of the memristor material can be read by applying a voltage across the material and measuring the current that passes through the target crosspoint device.

In order to limit power consumption, the crosspoint devices of ANN chip architectures are often designed to utilize offline learning techniques, wherein the approximation of the target function does not change once the initial training phase has been resolved. Offline learning allows the crosspoint devices of crossbar-type ANN architectures to be simplified such that they draw very little power.

Notwithstanding the potential for lower power consumption, executing offline training can be difficult and resource intensive because it is typically necessary during training to modify a significant number of adjustable parameters (e.g., weights) in the ANN model to match the input-output pairs for the training data. Accordingly, simplifying the crosspoint devices of ANN architectures to prioritize power-saving, offline learning techniques typically means that training speed and training efficiency are not optimized.

Providing simple crosspoint devices that keep power consumption within an acceptable range, as well as accelerate the speed and efficiency of training ANN architectures, would improve overall ANN performance and allow a broader range of ANN applications.

SUMMARY

Embodiments are directed to a two-terminal resistive processing unit (RPU) having a first terminal, a second terminal and an active region. The active region has a conduction state that identifies a weight of a training methodology applied to the RPU. The active region is configured to locally perform a data storage operation of the training methodology, and the active region is further configured to locally perform a data processing operation of the training methodology.

In one or more of the above-described embodiments, the data storage operation includes a change in the conduction state that is based at least in part on a result of the data processing operation.

In one or more of the above-described embodiments, the change in the conduction state includes a non-linear change based on at least one first encoded signal applied to the first terminal and at least one second encoded signal applied to the second terminal.

In one or more of the above-described embodiments, the active region is further configured to locally perform the data storage operation of the training methodology based at least in part on the non-linear change in the conduction state. The active region may be further configured to locally perform the data processing operation of the training methodology based at least in part on the non-linear change in the conduction state.

In one or more of the above-described embodiments, the training methodology may be an online neural network training, a matrix inversion or a matrix decomposition.

Embodiments are further directed to a two-terminal RPU having a first terminal, a second terminal and an active region. The active region effects a non-linear change in a conduction state of the active region based on at least one first encoded signal applied to the first terminal and at least one second encoded signal applied to the second terminal. The active region is configured to locally perform a data storage operation of a training methodology based at least in part on the non-linear change in the conduction state. The active region is further configured to locally perform a data processing operation of the training methodology based at least in part on the non-linear change in the conduction state.

In one or more of the above-described embodiments, the encoding of the at least one first encoded signal and the at least one second encoded signal includes a stochastic sequence of pulses or a magnitude modulation.

In one or more of the above-described embodiments, the non-linear change includes a rectifying non-linear change, a saturating non-linear change or an exponential non-linear change.

Embodiments are further directed to a trainable crossbar array having a set of conductive row wires and a set of conductive column wires configured to form a plurality of crosspoints at intersections between the set of conductive row wires and the set of conductive column wires. The array includes a two-terminal resistive processing unit RPU at each of the plurality of crosspoints. The RPU is configured to locally perform data storage operations and locally perform data processing operations, wherein both the local data storage operations and the local data processing operations are part of a training methodology applied to the trainable crossbar array.

In one or more of the above-described embodiments, the two-terminal RPU includes a first terminal, a second terminal and an active region having a conduction state, wherein the conduction state identifies a weight of the training methodology applied to the RPU.

In one or more of the above-described embodiments, the data storage operation includes a change in the conduction state that is based at least in part on a result of the data processing operation. The change in the conduction state includes a non-linear change based on at least one first encoded signal applied to the first terminal and at least one second encoded signal applied to the second terminal.

In one or more of the above-described embodiments, the active region locally performs the data storage operation of the training methodology based at least in part on the non-linear change in the conduction state. The active region is further locally performs the data processing operation of the training methodology based at least in part on the non-linear change in the conduction state. The training methodology includes an online neural network training, a matrix inversion and a matrix decomposition.

Embodiments are further directed to a method of forming a two-terminal RPU. The method includes forming a first terminal, forming a second terminal and forming an active region having a conduction state. The method further includes configuring the active region to effect a non-linear change in the conduction state based on at least one first encoded signal applied to the first terminal and at least one second encoded signal applied to the second terminal. The method further includes configuring the active region to locally perform a data storage operation of a training methodology based at least in part on the non-linear change in the conduction state. The method further includes configuring the active region to locally perform a data processing operation of the training methodology based at least in part on the non-linear change in the conduction state.

In one or more of the above-described method, the encoding of the at least one first encoded signal and the at least one second encoded signal includes a stochastic sequence of pulses or a magnitude modulation.

In one or more embodiments of the above-described method, the non-linear change includes a rectifying non-linear change, a saturating non-linear change or an exponential non-linear change.

Embodiments are further directed to a method of forming a trainable crossbar array. The method includes forming a set of conductive row wires, and forming a set of conductive column wires configured to form a plurality of crosspoints at intersections between the set of conductive row wires and the set of conductive column wires. The method further includes forming a two-terminal RPU at each of the plurality of crosspoints. The method further includes configuring the RPU to locally perform a data storage operation of a training methodology applied to the trainable crossbar array, and configuring the RPU to locally perform a data processing operation of the training methodology.

In one or more embodiments of the above-described method, forming the two-terminal RPU includes forming a first terminal, forming a second terminal and forming an active region having a conduction state, wherein the conduction state identifies a weight of the training methodology applied to the RPU.

In one or more embodiments of the above-described method, the data storage operation includes a change in the conduction state that is based at least in part on a result of the data processing operation, wherein the change in the conduction state includes a non-linear change based on at least one first encoded signal applied to the first terminal and at least one second encoded signal applied to the second terminal.

In one or more embodiments of the above-described method, the method further includes configuring the active region to locally perform the data storage operation of the training methodology based at least in part on the non-linear change in the conduction state. The method further includes configuring the active region to locally perform the data processing operation of the training methodology based at least in part on the non-linear change in the conduction state.

In one or more embodiments of the above-described method, the training methodology includes an online neural network training, a matrix inversion or a matrix decomposition.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

FIG. 5 depicts a simplified block diagram of a stochastic computing methodology capable of being used in one or more embodiments;

FIG. 6 depicts known equations that govern the operation of a passive, two-terminal memristor;

FIG. 7 depicts a graphical comparison between the linear switching characteristic of a known two-terminal memristor and the non-linear switching characteristic of a two-terminal RPU of the present disclosure;

FIGS. 11A-11B depict voltage sequences illustrating examples of positive and negative stochastic weight update cycles according to one or more embodiments;

FIG. 15 depicts graphs and equations further illustrating a height-modulation weight update methodology using a two-terminal, non-linear RPU according to one or more embodiments;

FIG. 16 depicts aspects of developing, training and using an ANN architecture comprising crossbar arrays of two-terminal, non-liner RPUs according to the present disclosure;

DETAILED DESCRIPTION

It is understood in advance that although one or more embodiments are disclosed in the context of biological neural networks with a specific emphasis on modeling brain structures and functions, implementation of the teachings recited herein are not limited to modeling a particular environment. Rather, embodiments of the present disclosure are capable of modeling any type of environment, including for example, weather patterns, arbitrary data collected from the internet, and the like, as long as the various inputs to the environment can be turned into a vector.

Although the present disclosure is directed to an electronic system, for ease of reference and explanation various aspects of the disclosed electronic system are described using neurological terminology such as neurons, plasticity and synapses, for example. It will be understood that for any discussion or illustration herein of an electronic system, the use of neurological terminology or neurological shorthand notations are for ease of reference and are meant to cover the neuromorphic, ANN equivalent(s) of the described neurological function or neurological component.

ANNs, also known as neuromorphic or synaptronic systems, are computational systems that can estimate or approximate other functions or systems, including, for example, biological neural systems, the human brain and brain-like functionality such as image recognition, speech recognition and the like. ANNs incorporate knowledge from a variety of disciplines, including neurophysiology, cognitive science/psychology, physics (statistical mechanics), control theory, computer science, artificial intelligence, statistics/mathematics, pattern recognition, computer vision, parallel processing and hardware (e.g., digital/analog/VLSI/optical).

Instead of utilizing the traditional digital model of manipulating zeros and ones, ANNs create connections between processing elements that are substantially the functional equivalent of the core system functionality that is being estimated or approximated. For example, IBM's SyNapse computer chip is the central component of an electronic neuromorphic machine that attempts to provide similar form, function and architecture to the mammalian brain. Although the IBM SyNapse computer chip uses the same basic transistor components as conventional computer chips, its transistors are configured to mimic the behavior of neurons and their synapse connections. The IBM SyNapse computer chip processes information using a network of just over one million simulated "neurons," which communicate with one another using electrical spikes similar to the synaptic communications between biological neurons. The IBM SyNapse architecture includes a configuration of processors (i.e., simulated "neurons") that read a memory (i.e., a simulated "synapse") and perform simple operations. The communications between these processors, which are typically located in different cores, are performed by on-chip network routers.

Figure 1:
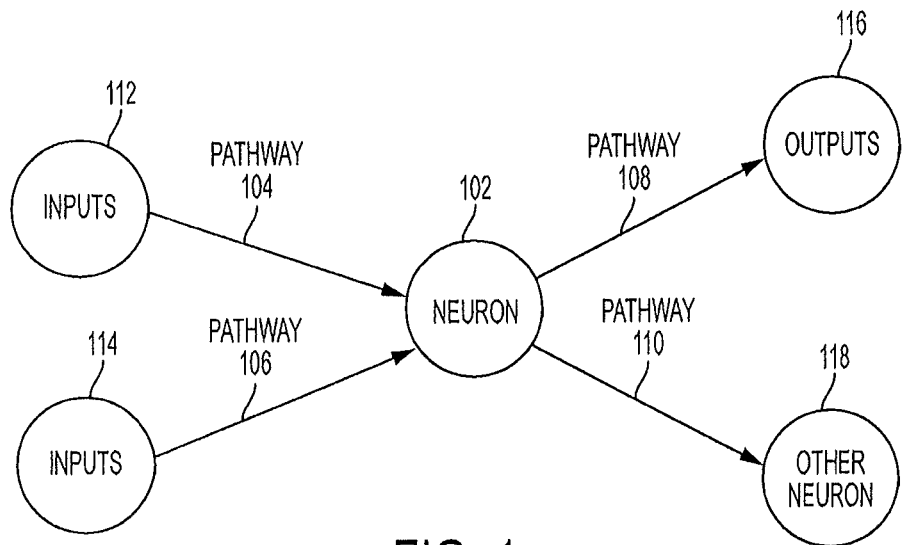
FIG. 1 depicts a simplified diagram of input and output connections of a biological neuron.
Figure 2:
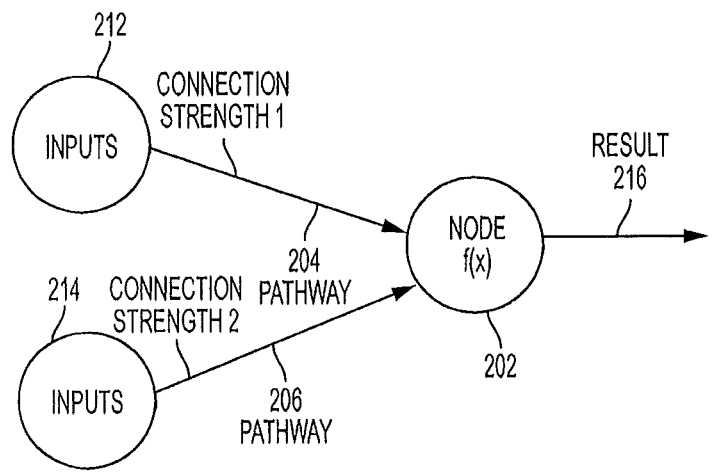
FIG. 2 depicts a known simplified model of the biological neuron shown in FIG. 1.
Figure 3:
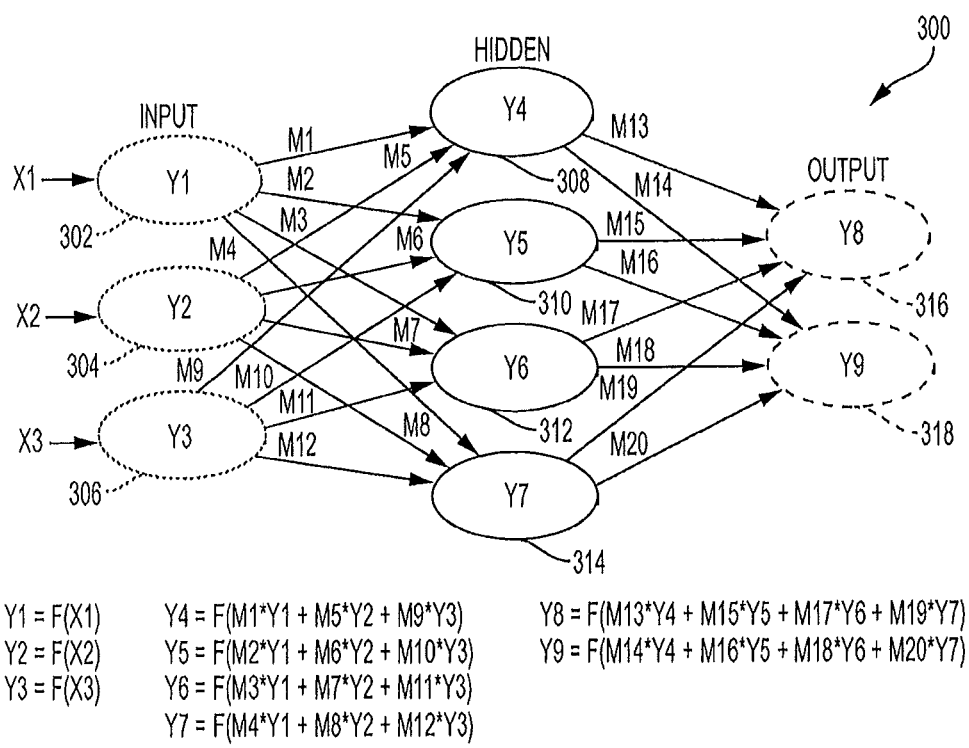
FIG. 3 depicts a known simplified model of an ANN incorporating the biological neuron model shown in FIG. 2.

As background, a general description of how a typical ANN operates will now be provided with reference to FIGS. 1, 2 and 3. As previously noted herein, a typical ANN models the human brain, which includes about one hundred billion interconnected cells called neurons. FIG. 1 depicts a simplified diagram of a biological neuron 102 having pathways 104, 106, 108, 110 that connect it to upstream inputs 112, 114, downstream output s116 and downstream "other" neurons 118, configured and arranged as shown. Each biological neuron 102 sends and receives electrical impulses through pathways 104, 106, 108, 110. The nature of these electrical impulses and how they are processed in biological neuron 102 are primarily responsible for overall brain functionality. The pathway connections between biological neurons can be strong or weak. When a given neuron receives input impulses, the neuron processes the input according to the neuron's function and sends the result of the function to downstream outputs and/or downstream "other" neurons.

Biological neuron 102 is modeled in FIG. 2 as a node 202 having a mathematical function, f(x) depicted by the equation shown in FIG. 2. Node 202 takes electrical signals from inputs 212, 214, multiplies each input 212, 214 by the strength of its respective connection pathway 204, 206, takes a sum of the inputs, passes the sum through a function, f(x), and generates a result 216, which may be a final output or an input to another node, or both. In the present disclosure, an asterisk (*) is used to represent a multiplication. Weak input signals are multiplied by a very small connection strength number, so the impact of a weak input signal on the function is very low. Similarly, strong input signals are multiplied by a higher connection strength number, so the impact of a strong input signal on the function is larger. The function f(x) is a design choice, and a variety of functions can be used. A typical design choice for f(x) is the hyperbolic tangent function, which takes the function of the previous sum and outputs a number between minus one and plus one.

FIG. 3 depicts a simplified ANN model 300 organized as a weighted directional graph, wherein the artificial neurons are nodes (e.g., 302, 308, 316), and wherein weighted directed edges (e.g., m1 to m20) connect the nodes. ANN model 300 is organized such that nodes 302, 304, 306 are input layer nodes, nodes 308, 310, 312, 314 are hidden layer nodes and nodes 316, 318 are output layer nodes. Each node is connected to every node in the adjacent layer by connection pathways, which are depicted in FIG. 3 as directional arrows having connection strengths m1 to m20. Although only one input layer, one hidden layer and one output layer are shown, in practice, multiple input layers, hidden layers and output layers may be provided.

Similar to the functionality of a human brain, each input layer node 302, 304, 306 of ANN 300 receives inputs x1, x2, x3 directly from a source (not shown) with no connection strength adjustments and no node summations. Accordingly, y1=f(x1), y2=f(x2) and y3=f(x3), as shown by the equations listed at the bottom of FIG. 3. Each hidden layer node 308, 310, 312, 314 receives its inputs from all input layer nodes 302, 304, 306 according to the connection strengths associated with the relevant connection pathways. Thus, in hidden layer node 308, y4=f(m1*y1+m5*y2+m9*y3), wherein * represents a multiplication. A similar connection strength multiplication and node summation is performed for hidden layer nodes 310, 312, 314 and output layer nodes 316, 318, as shown by the equations defining functions y5 to y9 depicted at the bottom of FIG. 3.

ANN model 300 processes data records one at a time, and it "learns" by comparing an initially arbitrary classification of the record with the known actual classification of the record. Using a training methodology knows as "backpropagation" (i.e., "backward propagation of errors"), the errors from the initial classification of the first record are fed back into the network and used to modify the network's weighted connections the second time around, and this feedback process continues for many iterations. In the training phase of an ANN, the correct classification for each record is known, and the output nodes can therefore be assigned "correct" values. For example, a node value of "1" (or 0.9) for the node corresponding to the correct class, and a node value of "0" (or 0.1) for the others. It is thus possible to compare the network's calculated values for the output nodes to these "correct" values, and to calculate an error term for each node (i.e., the "delta" rule). These error terms are then used to adjust the weights in the hidden layers so that in the next iteration the output values will be closer to the "correct" values.

There are many types of neural networks, but the two broadest categories are feed-forward and feedback/recurrent networks. ANN model 300 is a non-recurrent feed-forward network having inputs, outputs and hidden layers. The signals can only travel in one direction. Input data is passed onto a layer of processing elements that perform calculations. Each processing element makes its computation based upon a weighted sum of its inputs. The new calculated values then become the new input values that feed the next layer. This process continues until it has gone through all the layers and determined the output. A threshold transfer function is sometimes used to quantify the output of a neuron in the output layer.

A feedback/recurrent network includes feedback paths, which mean that the signals can travel in both directions using loops. All possible connections between nodes are allowed. Because loops are present in this type of network, under certain operations, it may become a non-linear dynamical system that changes continuously until it reaches a state of equilibrium. Feedback networks are often used in associative memories and optimization problems, wherein the network looks for the best arrangement of interconnected factors.

The speed and efficiency of machine learning in feed-forward and recurrent ANN architectures depend on how effectively the crosspoint devices of the ANN crossbar array perform the core operations of typical machine learning algorithms. Although a precise definition of machine learning is difficult to formulate, a learning process in the ANN context can be viewed as the problem of updating the crosspoint device connection weights so that a network can efficiently perform a specific task. The crosspoint devices typically learn the necessary connection weights from available training patterns. Performance is improved over time by iteratively updating the weights in the network. Instead of following a set of rules specified by human experts, ANNs "learn" underlying rules (like input-output relationships) from the given collection of representative examples. Accordingly, a learning algorithm may be generally defined as the procedure by which learning rules are used to update and/or adjust the relevant weights.

The three main learning algorithm paradigms are supervised, unsupervised and hybrid. In supervised learning, or learning with a "teacher," the network is provided with a correct answer (output) for every input pattern. Weights are determined to allow the network to produce answers as close as possible to the known correct answers. Reinforcement learning is a variant of supervised learning in which the network is provided with only a critique on the correctness of network outputs, not the correct answers themselves. In contrast, unsupervised learning, or learning without a teacher, does not require a correct answer associated with each input pattern in the training data set. It explores the underlying structure in the data, or correlations between patterns in the data, and organizes patterns into categories from these correlations. Hybrid learning combines supervised and unsupervised learning. Parts of the weights are usually determined through supervised learning, while the others are obtained through unsupervised learning. Additional details of ANNs and learning rules are described in Artificial Neural Networks: A Tutorial, by Anil K. Jain, Jianchang Mao and K. M. Mohiuddin, IEEE, March 1996, the entire disclosure of which is incorporated by reference herein.

As previously noted herein, in order to limit power consumption, the crosspoint devices of ANN chip architectures are often designed to utilize offline learning techniques, wherein the approximation of the target function does not change once the initial training phase has been resolved. Offline learning allows the crosspoint devices of crossbar-type ANN architectures to be simplified such that they draw very little power.

Figure 4:
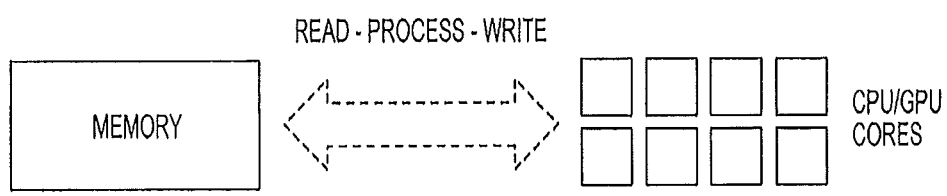
FIG. 4 depicts a simplified block diagram of a known weight update methodology.

Notwithstanding the potential for lower power consumption, executing offline training can be difficult and resource intensive because it is typically necessary during training to modify a significant number of adjustable parameters (e.g., weights) in the ANN model to match the input-output pairs for the training data. FIG. 4 depicts a simplified illustration of a typical read-process-write weight update operation, wherein CPU/GPU cores (i.e., simulated "neurons") read a memory (i.e., a simulated "synapse") and perform weight update processing operations, then write the updated weights back to memory. Accordingly, simplifying the crosspoint devices of ANN architectures to prioritize power-saving, offline learning techniques typically means that training speed and training efficiency are not optimized.

Providing simple crosspoint devices that keep power consumption within an acceptable range, as well as accelerate the speed and efficiency of training ANN architectures, would improve overall ANN performance and allow a broader range of ANN applications.

Turning now to an overview of the present disclosure, one or more embodiments are directed to a two-terminal programmable resistive crosspoint component referred to herein as a resistive processing unit (RPU), which provides local data storage functionality and local data processing functionality. In other words, when performing data processing, the value stored at each RPU is updated in parallel and locally, which eliminate the need to move relevant data in and out of a processor and a separate storage element. Additionally, the local data storage and local data processing provided by the disclosed two-terminal RPUs accelerate the ANN's ability to learn and implement algorithms such as backpropagating online neural network training, matrix inversion, matrix decomposition and the like. Accordingly, implementing a machine learning ANN architecture having the disclosed RPU enables the implementation of online machine learning capabilities that optimize the speed, efficiency and power consumption of learning. The disclosed RPU and resulting ANN architecture improve overall ANN performance and enable a broader range of practical ANN applications.

The disclosed RPU may be implemented as two-terminal resistive cross point devices, wherein their switching characteristics have a non-linearity that can be used for processing data. Thus, the disclosed RPU may be implemented by any two-terminal device having an appropriate non-linear characteristic that may be used to perform calculations in an ANN. For example, the disclosed RPU device may be implemented with resistive random access memory (RRAM), phase change memory (PCM), programmable metallization cell (PMC) memory, non-linear memristive systems, or any other two-terminal device that has non-linear resistive switching characteristics.

Prior to a more detailed description of the disclosed RPU, an overview of systolic arrays, stochastic computing and linear and non-linear memristor devices, which are relevant to the present disclosure, will now be provided. Systolic arrays are composed of parallel processing elements (PE) that attempt to accelerate the learning of certain highly used algorithms. Systolic arrays are often hard-wired for specific operations, such as "multiply and accumulate," to perform massively parallel integration, convolution, correlation, matrix multiplication or data sorting tasks. In a publication by C. Lehmann et al., titled "A Generic Systolic Array Building Block For Neural Networks with On-Chip Learning," IEEE Transactions On Neural Networks, Vol. 4, No. 3, May 1993, it is proposed to use systolic arrays as a building block for online learning neural networks, wherein each PE in the systolic array has local storage to store a single weight value and is capable of performing computations necessary for matrix multiplication and weight updates. The very-large-scale integration (VLSI) implementation of the PE described in the Lehmann article requires approximately 1800 transistors per PE, which increases power consumption and decreases scalability. It is therefore desirable to provide PEs that requires as few transistors per PE as possible.

Stochastic computing is a collection of techniques that represent continuous values by streams of random bits, wherein complex computations can be computed by simple bit-wise operations on the streams. Specifically, if there are two random and independent bit streams $S_1$, $S_2$ called stochastic numbers (i.e., a Bernoulli process), wherein the probability of a "one" in the first stream is p, and the probability of a "one" in the second stream is q, the logical AND of the two streams can be taken as shown in FIG. 6. The probability of a "one" in the output stream is pq. By observing enough output bits and measuring the frequency of "ones," it is possible to estimate pq to arbitrary accuracy. Because of the design simplicity of these so-called "multiply and accumulate" operations, which can be implemented with a few logic gates/transistors, stochastic computing is often used in the hardware design for neural networks. A publication by V. K. Chippa et al. titled "StoRM: A Stochastic Recognition and Mining Processor," Proceedings of the 2014 International Symposium On Low power Electronics and Design, shows an application of stochastic computing to two-dimensional (2D) systolic arrays that can be used as a hardware accelerator for neural network training algorithms.

However, in the Chippa et al. article, the necessary weights for the computations are supplied to the systolic array from external locations, and updates to the weights are not performed by the array. The Chippa et al. article only addresses the acceleration of vector-matrix multiplication or matrix-matrix multiplication operations that are heavily used during neural network training. However, systolic arrays without local storage cannot perform the weight updates in parallel because the weights are stored at an external memory location. Accelerating the weight updates, which is not disclosed by the Chippa et al. article, is necessary in order to accelerate the overall learning algorithm.

The term "memristor" is used to describe a passive two-terminal electrical component, wherein the resistance value of the device depends on the history of the voltages that have previously been applied to the device. The operation of a memristor is governed by Equations [1] and [2] shown in FIG. 6, wherein i is the current passing through the device, v is the voltage applied to the device, g is the conductance value of the device (which is the inverse of the resistance), s is the internal state variable of the device that controls the conductance value and f is the function that shows the time evolution of the internal state variable s. In a publication by Chua, L. O., titled "Resistance Switching Memories are Memristors," Applied Physics A (2011), 102 (4): 765-783, memristor functionality is proposed for the operation of resistive memory devices such as resistive random-access-memory (RRAM), phase change memory (PCM) and conductive-bridging random-access-memory (CBRAM). Because a memristor device remembers its history (i.e., the so-called "non-volatility property"), the Chua article proposes such devices as possible alternatives for non-volatile memory technologies.

A publication by D. Soudry et al., titled "Memristor-Based Multilayer Neural Networks With Online Gradient Descent Training," IEEE Transactions On Neural Networks and Learning Systems (2015), proposes the use of memristors for back-propagating neural network training hardware. However, the Soudry et al article assumes an ideal memristor operation, wherein the change in resistance is linear with respect to the voltage applied to the device. The Soudry et al. design assumed that the function f(s,v) in Equation [2] of FIG. 6 is a simple function given by the relationship f(s,v)=v. The Soudry et al. article proposes an architecture that is similar to a 2D systolic array as described above, wherein each crosspoint is implemented with an ideal memristor and a pair of transistors. In the Soudry et al. article, the memristor is in effect used to store the weight value, and the pair of transistors is used to compute a local multiplication operation that is needed for the weight updates, wherein the result of the weight update modifies the memristor's conduction state. The Soudry et al. article discloses, in effect, a four terminal device composed of a memristor and two transistors, which are used to make a 2D array of the 4 terminal devices in order to implement the back-propagation training of the neural network hardware.

Turning now to a more detailed description of the present disclosure, one or more embodiments are directed to two-terminal RPUs, which provide local data storage functionality and local data processing functionality without the necessity of extra circuit elements such as transistors and off-chip storage and/or processing components. The disclosed RPU may be implemented as any device that has a non-linear switching characteristic, including but not limited to RRAM, PCM, CBRAM, non-linear memristive systems, and the like.

When implementing the disclosed RPU device as a memristive system, it is important that the memristor is non-ideal with a non-linear switching characteristic. In an ideal memristor, the change in resistance is linearly proportional to the voltage applied to the ideal memristor device. Accordingly, as soon as an ideal memristor device experiences any voltage its resistance state changes. However, for disclosed RPU devices implemented as non-ideal, non-linear memristive systems, there is a well-defined "SET" voltage, $V_{SET}$, (which is characteristics of the device), and the memristive RPU device would need to experience a voltage $V>V_{SET}$ in order to change its internal resistance state. For such devices, a half bias application of a voltage $V=0.5V_{SET}$ does not cause any change in the internal resistance state.

To further illustrate the difference between an ideal memristor and a non-ideal, non-linear memristor that may be used to implement the disclosed RPU, FIG. 7 is a graph illustrating a comparison between the voltage switching behaviors of an ideal memristor and an RPU in accordance with the present disclosure. The vertical axis represents device state change at a particular voltage, and the horizontal axis represents the voltage applied. In an ideal memristor operation, a change in resistance is linearly proportional to the voltage applied to the device. Thus, as soon as the memristor sees any voltage, its resistance state changed. This is shown by curve 702, which shows that the change in state is dramatic even at low voltages.

For non-linear RPU devices as shown by the curve 704, there is a well-defined set voltage, $V_{SET}$, that the device needs to experience in order to change its internal resistance state. A bias voltage of $0.5V_{SET}$ will not change the internal resistance state. In the present disclosure, this non-linear characteristic of the RPU device is exploited to perform multiplication locally. Assuming $f_1$ is small, the device will not change its internal state when only $0.5V_{SET}$ is applied. Notably, FIG. 7 illustrates positive voltages and positive changes to the resistive state of the RPU device, however, a similar relationship between negative voltages and negative resistance changes also exists.

Figure 8:
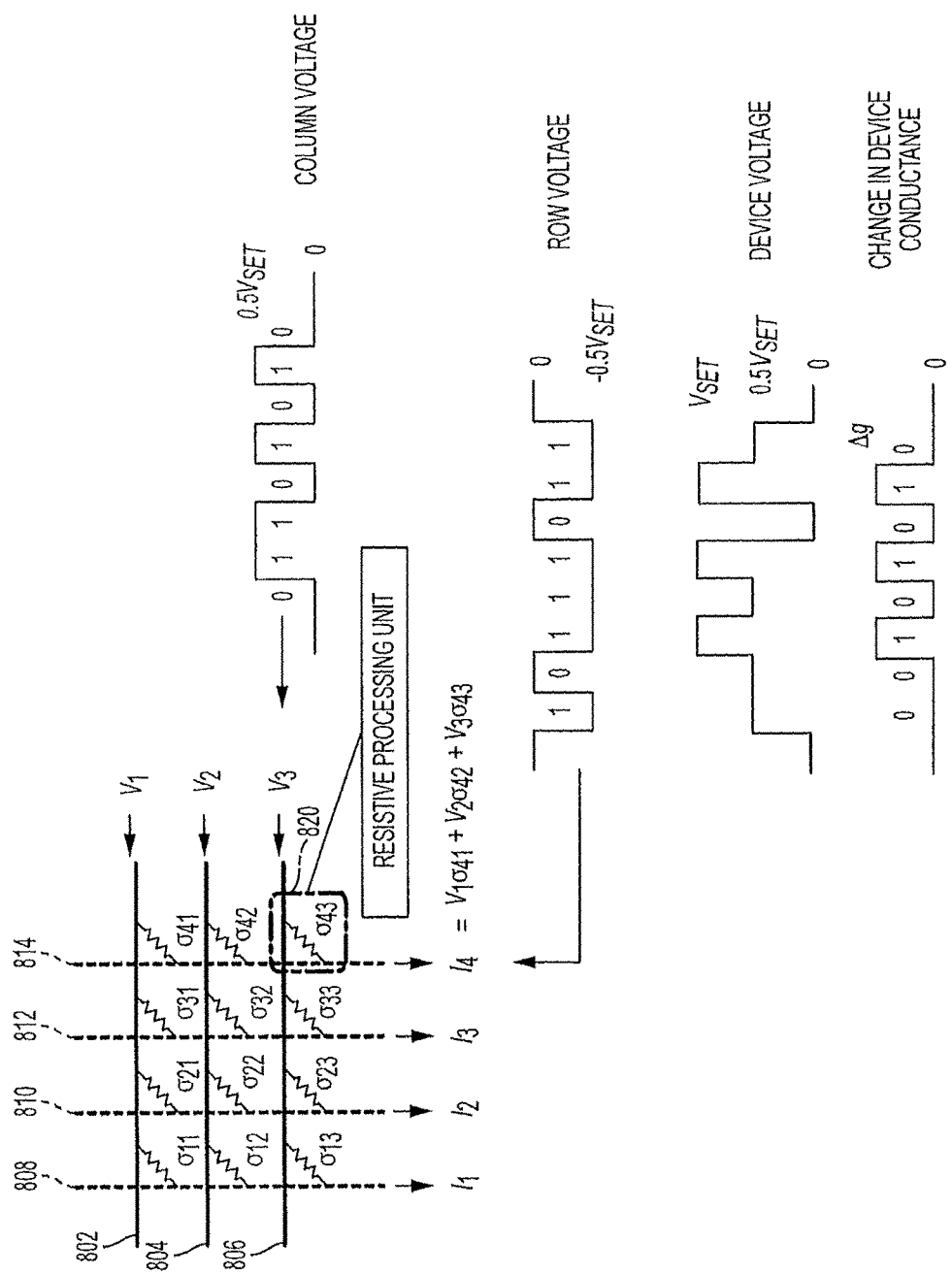
FIG. 8 depicts a cross bar array of two-terminal, non-linear RPU devices according to the present disclosure, along with voltage sequences illustrating the operation of the RPU.

FIG. 8 is a diagram of a two-dimensional (2D) crossbar array 800 that performs forward matrix multiplication, backward matrix multiplication and weight updates according to the present disclosure. Crossbar array 800 is formed from a set of conductive row wires 802, 804, 806 and a set of conductive column wires 808, 810, 812, 814 that intersect the set of conductive row wires 802, 804, 806. The intersections between the set of row wires and the set of column wires are separated by RPUs, which are shown in FIG. 8 as resistive elements each having its own adjustable/updateable resistive weight, depicted as $\sigma_{11}$, $\sigma_{21}$, $\sigma_{31}$, $\sigma_{41}$, $\sigma_{12}$, $\sigma_{22}$, $\sigma_{32}$, $\sigma_{42}$, $\sigma_{13}$, $\sigma_{23}$, $\sigma_{33}$ and $\sigma_{43}$, respectively. For ease of illustration, only one RPU 820 is labeled with a reference number in FIG. 8. In forward matrix multiplication, the conduction state (i.e., the stored weights) of the RPU can be read by applying a voltage across the RPU and measuring the current that passes through the RPU.

Input voltages $V_1$, $V_2$, $V_3$ are applied to row wires 802, 804, 806, respectively. Each column wire 808, 810, 812, 814 sums the currents $I_1$, $I_2$, $I_3$, $I_4$ generated by each RPU along the particular column wire. For example, as shown in FIG. 8, the current $I_4$ generated by column wire 814 is according to the equation $I_4=V_1\sigma_{41}+V_2\sigma_{42}+V_3\sigma_{43}$. Thus, array 800 computes the forward matrix multiplication by multiplying the values stored in the RPUs by the row wire inputs, which are defined by voltages $V_1$, $V_2$, $V_3$. The backward matrix multiplication is very similar. In backward matrix multiplication, voltages are applied at column wires 808, 810, 812, 814 then read from row wires 802, 804, 806. For weight updates, which are described in greater detail below, voltages are applied to column wires and row wires at the same time, and the conductance values stored in the relevant RPU devices all update in parallel. Accordingly, the multiplication and addition operations required to perform weight updates are performed locally at each RPU 820 of array 800 using the RPU device itself plus the relevant row or column wire of array 800. Thus, in accordance with the present disclosure, no read-update-write cycles (shown in FIG. 4) are required in array 800.

Continuing with the diagram of FIG. 8, in accordance with one or more embodiments, the operation of a positive weight update methodology for RPU 820 and its corresponding weight $\sigma_{33}$ at the intersection of conductive row wire 806 and conductive column wire 812 will now be provided. The non-linear characteristics of RPU 820 are used to perform multiplication operations locally at RPU 820 using stochastic computing as described below. More specifically, the disclosed methodology uses the non-linear switching characteristics of RPU 820 and stochastic bit streams 830, 832 to perform multiplication operations and the necessary weight updates locally at RPU 820 without the necessity of other circuit elements. Update generator circuitry (not shown) is provided at the periphery of crossbar array 800 and used as a peripheral "translator" in order to generate necessary voltage pulses in the form of stochastic bit streams (e.g., 830, 832) that would be applied to all RPUs of 2D crossbar array 800 in parallel.

Referring briefly to the diagram of FIG. 7, it is assumed that $f_1$ for RPU 820 shown in FIG. 8 is very small (e.g., $f_1$=0) which means that RPU 820 does not change its internal state when only $0.5V_{SET}$ is applied to it. A row voltage sequence or bit stream 830, which is applied to row wire 806, is shown as a sequence of voltage pulses representing weight updates having a voltage of zero or a voltage of $+0.5V_{SET}$. A column voltage sequence or bit stream 832, which is applied to column wire 814, is shown as a sequence of voltage pulses also representing weight updates having either a voltage of zero or a voltage of $-0.5V_{SET}$. In example of FIG. 8, ⅘ is encoded by row voltage sequence 830, and ⅚ is encoded by column voltage sequence 832. The example voltage sequences 830, 832 represent a positive resistance change phase of the weight update. After the positive weight updates are performed, a separate set of sequences with the polarity of the respective voltages reversed may be used to update weights in a negative direction for those weights that need such correction.

Voltage sequence 834 is the voltages applied to RPU 820 resulting from the difference between row voltage sequence 830 and column voltage sequence 832. Voltage sequence 834 will have 3 voltage steps at 0V, $0.5V_{SET}$ and $V_{SET}$. However, because the resistance $\sigma_{43}$ of RPU 820 only changes for device voltages reaching $V_{SET}$, a single pulse either send through a column wire or a row wire is not enough to change the resistance state of RPU 820. When a column wire sends a voltage at $0.5V_{SET}$, and a row wire sends a voltage at $-0.5V_{SET}$, the resulting $V_{SET}$ pulse applied to the relevant RPU will cause an incremental change in the resistance of the device. Accordingly, the voltage pulses applied to RPU 820 utilize the non-linear switching characteristic of RPU 820 in order to perform a bit wise stochastic AND operation (e.g., as shown in FIG. 5) locally at RPU 820. Hence, the resulting change in the stored weight (e.g., $\sigma_{43}$) of the RPU is proportional to the product of the two numbers (⅘*⅚=⅜) "translated" by update generator circuitry, which is peripheral to crossbar array 800.

Figure 9B:
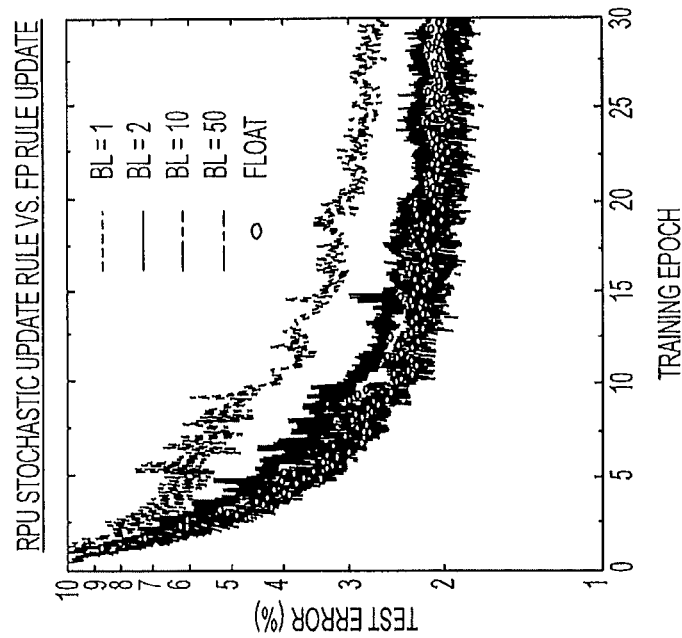
FIG. 9B depicts a graph illustrating classification accuracies of an ANN trained on an MNIST dataset using different weight update accuracies that can be achieved for different bit lengths (BLs) of the stochastic weight update methodology of the present disclosure.
Figure 9A:
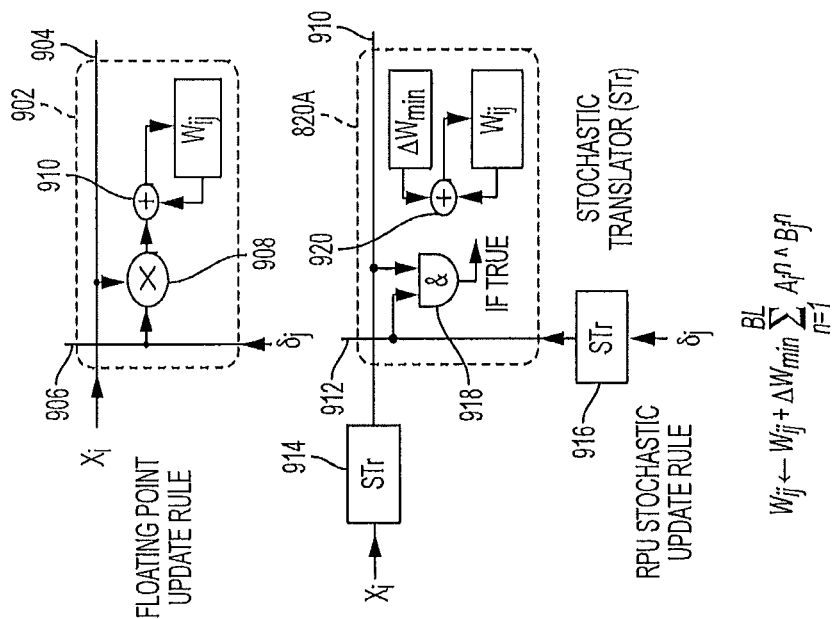
FIG. 9A depicts a simplified block diagram of a stochastic weight update methodology according to one or more embodiments.

FIGS. 9A and 9B illustrate a comparison of the classification error rate performance of an exemplary known floating point (FP) weight update rule against the disclosed stochastic-RPU (SRPU) update rule. The FP weight update rule requires calculating a vector-vector outer product which is equivalent to a multiplication operation and an incremental weight update to be performed locally at each cross-point as shown in FIG. 9A. The FP weight update rule may be expresses as $w_{ij} \leftarrow w_{ij} + \eta x_i \delta_j$, wherein $w_{ij}$ represents the weight value for the $i^{th}$ row and the $j^{th}$ column, $x_i$ is the activity at the input neuron, $\delta_j$ is the error computed by the output neuron and $\eta$ is the global learning rate.

As shown in FIG. 9A, the FP weight update rule uses a FP crosspoint device 902 located at a crosspoint between a row wire 904 and a column wire 906 of a crossbar array (not shown). FP crosspoint device 902 includes processing components (not shown) having more than two terminals, wherein the processing components receive update data as FP numbers via signals $x_1$ and $\delta_j$ applied at row wire 904 and column wire 906, respectively. FP crosspoint device 902 calculates the weight update, $W_{ij}$, using multiplication operations 908 and addition operations 910, then stores the weight update, $W_{ij}$. The FP weight update rule provides accuracy but requires either a read-write-process update operation (e.g., shown in FIG. 4) or relatively complex and power consuming local processing components having more than two terminals. For example, the processing components of FP crosspoint device 902 may be implemented as a two-terminal ideal memristor working in tandem with a pair of transistors as described the Soudry et al. article. The memristor is in effect used to store the weight value, and the pair of transistors is used to compute a local multiplication operation that is needed for the weight updates, wherein the result of the weight update modifies the memristor's conduction state.

An embodiment of the disclosed SRPU weight update rule is shown in Equation 3 of FIG. 9A, wherein where BL is length of the bit stream that is used during the update cycle, $\Delta w_{min}$ is the effective change in the weight value due to a single coincidence event, $A_i^n$ and $B_j^n$ are random variables that are characterized by the Bernoulli process, and their success rates are controlled by xi and δj respectively and superscript n represents pulse index. The SRPU weight update rule shown in FIG. 9A enables all of the RPU devices in a single array to work in parallel and perform the local multiplication operation by simply replying on the statistics of coincidence events. However, because of the stochastic nature of the updates, the results would always be probabilistic and the variance to mean ratio of the multiplication operation would be proportional to an inverse of the square root of BL.

As shown in FIG. 9A, the SRPU weight update rule uses a RPU crosspoint device 820A, which operates in substantially the same manner as RPU 820 shown in FIG. 8 and described in detail above. RPU 820A is located at a crosspoint between a row wire 910 and a column wire 912 of a crossbar array (not shown). RPU 820A includes processing components (shown at 820 in FIG. 8) having two terminals, wherein the processing components receive update data as stochastic numbers via stochastic signals generated by stochastic translators 914, 916 that receive input data $x_i$ and $\delta_j$ and apply stochastic voltage sequences to row wire 912 and column wire 914, respectively. RPU 820A calculates the new value of $W_{ij}$, using the stochastic bit streams, the non-linear characteristics of the RPU 820A, an AND operation 918 and an addition operation 920. More specifically, RPU 820A causes an incremental conductance change that is equivalent to a weight change, $\Delta w_{min}$, for every coincidence event and adds $\Delta w_{min}$ to the stored weight value to arrive at the updated weight value, $W_{ij}$.

The graph of FIG. 9B illustrates the results of a comparison between the classification error rates of the SRPU weight update rule and classification error rates of the FP weight update rule by analyzing the problem of training deep neural network using the backpropagation algorithm with a probabilistic update rule as defined in the above-described SRPU weight update rule and compare the results against a baseline using the above-described FP weight update rule. The digit classification task is performed on the MNIST dataset. The deep neural network was composed of fully connected layers, wherein each layer included 784, 256, 128 and 10 neurons respectively from input to output. No preprocessing of the data was performed, and the raw pixel values were given as an input. Sigmoid neurons were used at the hidden layers, and softmax neurons were used at the output. A cross-entropy objective function was used. For the baseline FP weight update, the training was performed using floating point arithmetic with a batch size of unity and learning rate of 0.01, 0.005 and 0.0025 for epochs from 0-10, 11-20 and 21-30, respectively. The baseline reached classification accuracies of about 2.0% on the test data at the end of 30 epochs as illustrated by the open circles on the graph shown in FIG. 9A.

The learning rate is an important hyper parameter that must be adjusted to some degree in order to achieve acceptable convergence properties of the neural network. Therefore, for the disclosed SRPU weight update, a learning rate is used that is on average identical to the values used for the FP weight update baseline. The simulations illustrated in FIG. 9B assumed that the $x_i$ and $\delta_j$ are directly translated to stochastic streams without any scaling, and that $P(A_i^n=\text{success})=x_i$ and $P(B_j^n=\text{success})=\delta_j$. Therefore the average change in the weight value can be written as $\mathbb{E}(\Delta w_{ij})=BL\times\Delta W_{min}\times x_i\delta_j$. In the first set of simulations, BL was fixed, and $\Delta w_{min}=\eta/BL$ in order match the learning rate used for the FP weight update baseline. Training was performed using different BL to observe the tolerance of the algorithm to the SRPU weight updates. As shown in the graph of FIG. 9B, the SRPU weight update rule is very robust against BL and indeed for BL≥10 the accuracy of the SRPU weight update rule becomes indistinguishable from the baseline FP weight update rule. Thus, as demonstrated in FIG. 9B, the SRPU weight update can perform as well as the FP weight update and can be implemented by RPU devices operating in parallel independent of the array size by simply using a BL≥10 cycles.

Figure 10A:
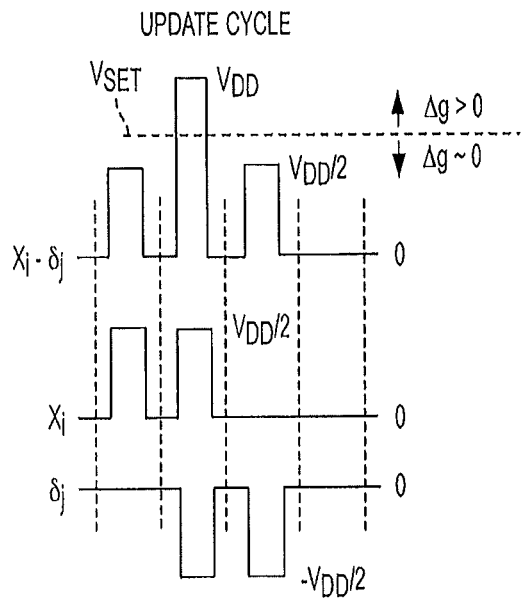
FIGS. 10A-D depict simplified diagrams and graphs illustrating additional details for implementing stochastic weight updates using a two-terminal, non-linear RPU according to one or more embodiments.
Figure 10B:
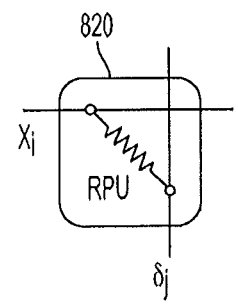
Figure 10C:
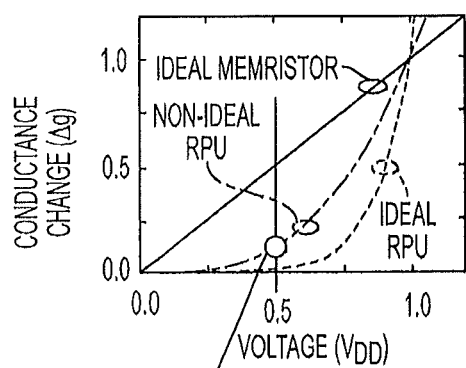
Figure 10D:
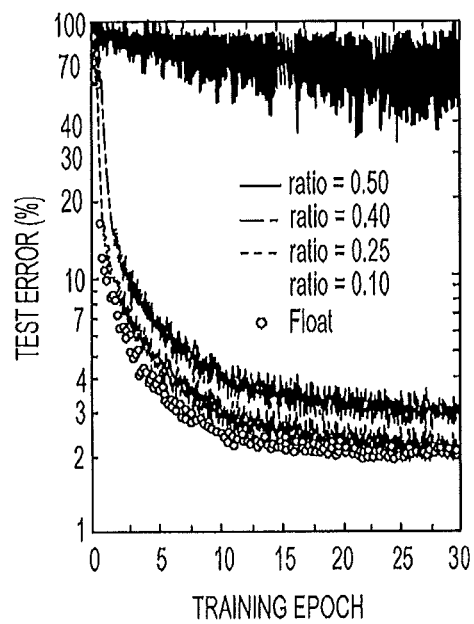

FIGS. 10A-D depict simplified diagrams and graphs illustrating how a measure of RPU linearity (r) may be calculated for the disclosed stochastic weight updates using a two-terminal, non-linear RPU according to one or more embodiments. FIG. 10A depicts the stochastic voltage sequences, which have previously described, and FIG. 10B depicts RPU 820, which receives and responds to the stochastic voltage sequences. FIG. 10A, also depicts, Δg, which is the change in the RPU's conduction value in response to the voltage sequences applied at $x_i$ and $\delta_j$. More specifically, Δg is the response of RPU 820 to a voltage pulse that reaches $V_{DD}$. Accordingly, a device linearity ratio, r, may be determined according to the equation shown in FIG. 10A. FIG. 10C is a switching diagram, similar to FIG. 7, which plots Δg vs. VDD, compares the response of an ideal memristor against a non-ideal RPU and an ideal RPU. FIG. 10C depicts the classification errors for different non-linearity ratios. FIGS. 10C and 10D demonstrate that RPU 820 may be designed and operated at different levels of non-linearity by changing the relevant parameters, and that even if RPU 820 is non-ideal, it can still be operated at acceptable classification error rates.

FIG. 10A depicts positive update cycle pulses. FIGS. 11A and 11B depict that, by changing the polarity of pulses, both positive and negative update cycles can be implemented.

Figure 12:
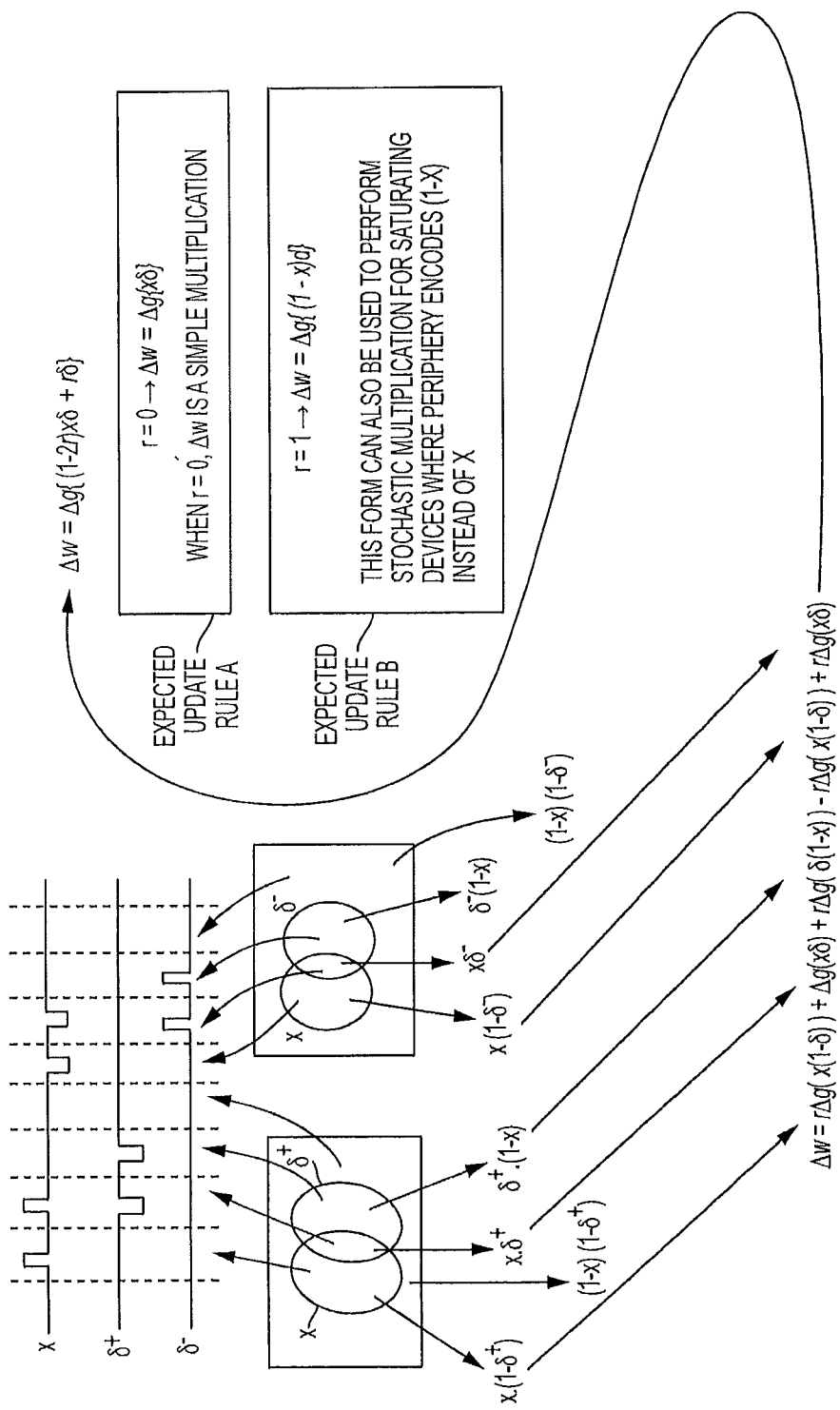
FIG. 12 depicts simplified diagrams and graphs illustrating additional details for implementing stochastic weight updates using a two-terminal, non-linear RPU according to one or more embodiments.

FIG. 12 depicts simplified diagrams and graphs illustrating additional details for implementing stochastic weight updates using a two-terminal, non-linear RPU according to one or more embodiments. FIG. 12 demonstrates on average how much weight change Δw will be obtained by the positive and negative pulsing scheme shown in FIGS. 11A and 11B. Accordingly, $x_i$ and $\delta_j$ populate both the positive update cycle and the negative update cycle based on the respective pulse sign. This guarantees that when there is overlap on the RPU, the voltage on the RPU is capable of passing the threshold in either the positive direction or the negative direction based on the sign of Δg. The diagrams shown below the pulse sequences are just graphical representations of how the pulses x, $\delta^+$ and $\delta^-$ in the pulse sequences interact. By summing the expected values, as shown by the equation for Δw based on the contributions from the half pulses and full pulses, two forms of the final expected update rule Δw may be derived.

Figure 13B:
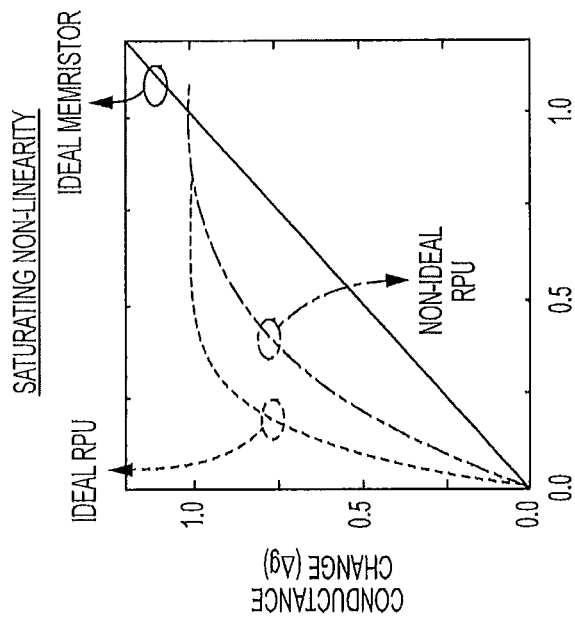
FIG. 13A-B depict graphical comparisons between the linear switching characteristic of a known two-terminal memristor and the non-linear switching characteristic of a two-terminal RPU of the present disclosure.
Figure 13A:
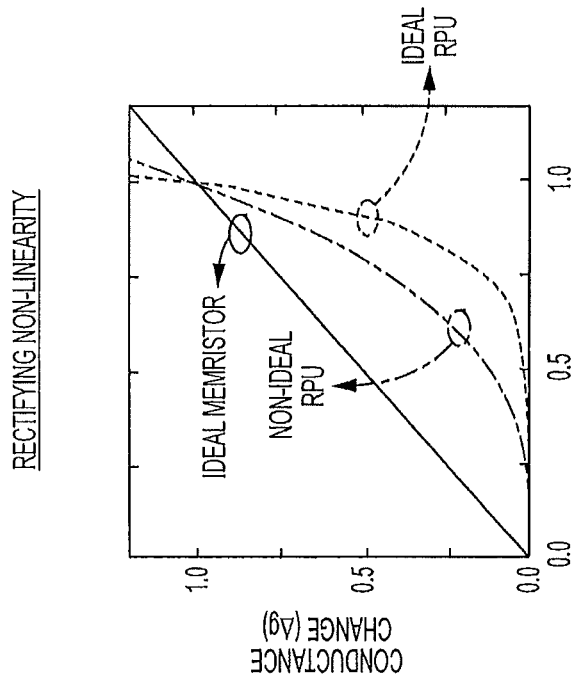

FIGS. 13A and 13B depict a side by side comparison a rectifying non-linearity (also shown in FIG. 10C) of the disclosed RPU and a saturating non-linearity of the disclosed RPU. For the non-saturating linearity, it will be necessary to, instead of encoding x into the RPU, encode 1-x in order for the saturating non-linear RPU to perform the necessary multiplication.

Figure 14:
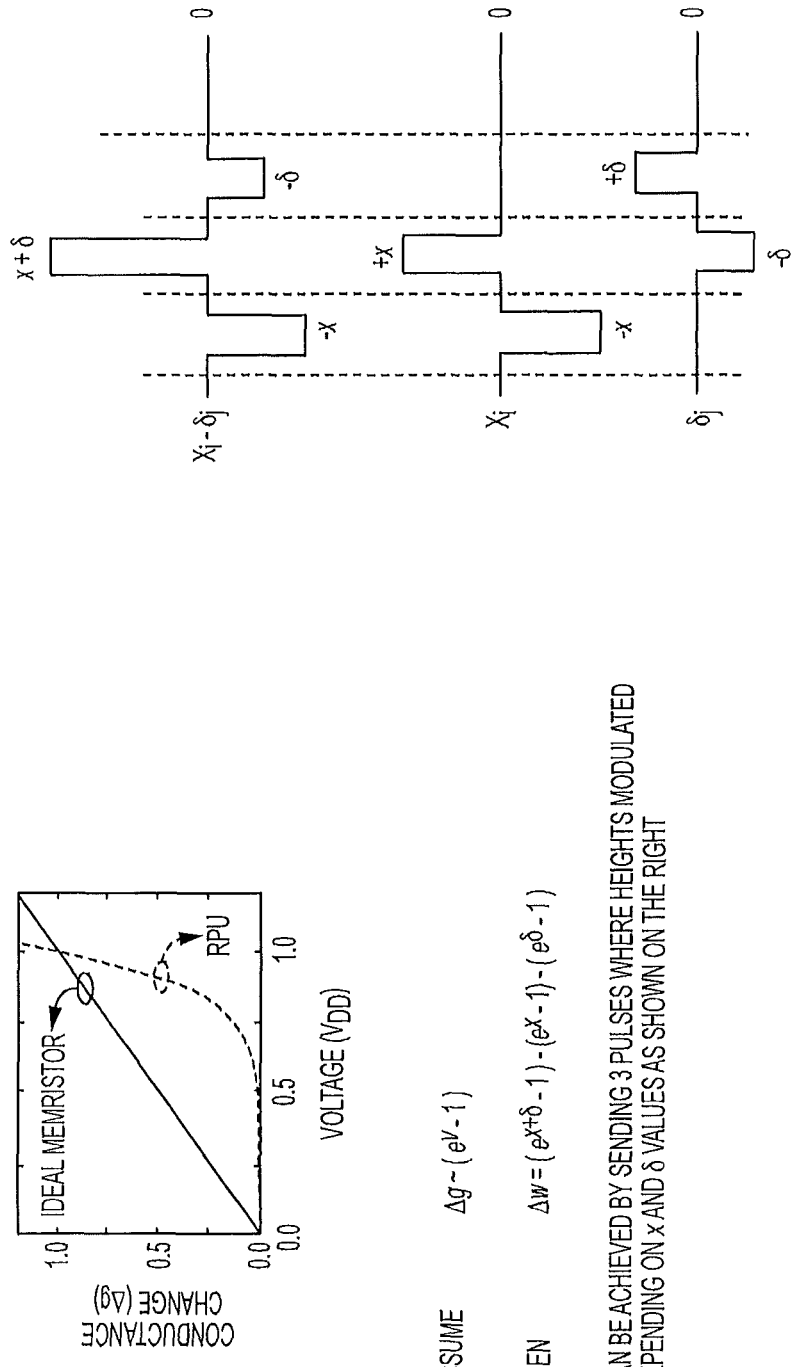
FIG. 14 depicts graphs, diagrams and equations illustrating a height-modulation weight update methodology using a two-terminal RPU having an exponential non-linearity according to one or more embodiments.

FIGS. 14 and 15 depicts graphs, diagrams and equations illustrating an expected weight update rule Δw when a height-modulation pulsing scheme is used, along with a two-terminal RPU having an exponential non-linearity. In this example, the stochastic encoding is replaced by voltage height modulation. As shown in FIG. 15, a Taylor expansion may be used to simplify the expected weight update rule to Δw=xδ. Accordingly, the derivation shown in FIGS. 14 and 15 demonstrates that the higher order terms shown in FIGS. 14 and 15 do not matter, and the exponential, height modulated RPU works as well as the previously described embodiments, as shown by the graph shown at the lower right of FIG. 15.

Figure 17:
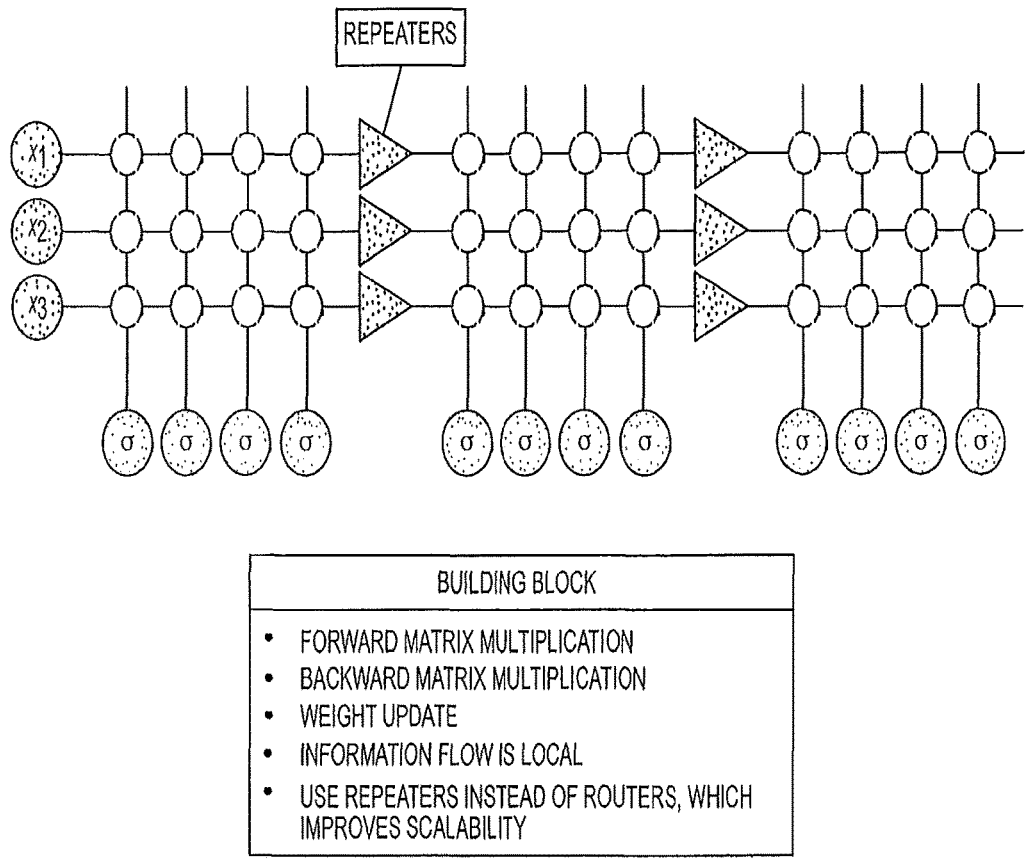
FIG. 17 depicts additional aspects of developing, training and using an ANN architecture comprising crossbar arrays of two-terminal, non-liner RPUs according to the present disclosure.
Figure 18:
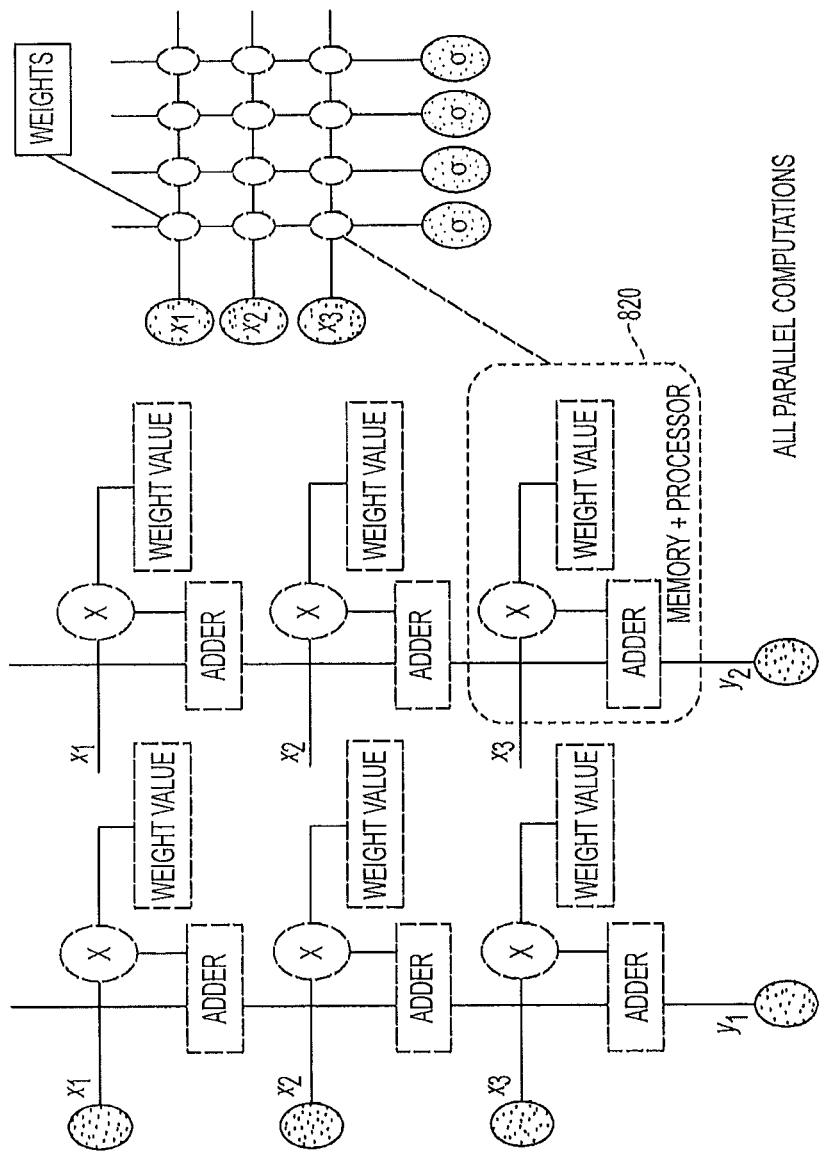
FIG. 18 depicts additional aspects of developing, training and using an ANN architecture comprising crossbar arrays of two-terminal, non-liner RPUs according to the present disclosure.

FIGS. 16-18 depict aspects of developing, training and using an ANN architecture comprising crossbar arrays of two-terminal, non-liner RPUs according to the present disclosure. FIG. 16 depicts a starting point for designing a neural network. In effect, FIG. 16 is an alternative representation of the neural network diagram shown in FIG. 3. As shown in FIG. 16, the input neurons, which are $x_1$, $x_2$ and $x_3$ are connected to hidden neurons, which are shown by sigma (σ). Weights, which represent a strength of connection, are applied at the connections between the input neurons/nodes and the hidden neurons/nodes, as well as between the hidden neurons/nodes and the output neurons/nodes. The weights are in the form of a matrix. As data moves forward through the network, vector matrix multiplications are performed, wherein the hidden neurons/nodes take the inputs, perform a non-linear transformation, and then send the results to the next weight matrix. This process continues until the data reaches the output neurons/nodes. The output neurons/nodes evaluate the classification error, and then propagate this classification error back in a manner similar to the forward pass, which results in a vector matrix multiplication being performed in the opposite direction. For each data set, when the forward pass and backward pass are completed, a weight update is performed. Basically, each weight will be updated proportionally to the input to that weight as defined by the input neuron/node and the error computed by the neuron/node to which it is connected.

FIG. 17 shows how the network can be divided into building blocks that are connected by repeaters, thus allowing the neural network to be extended to an arbitrary size. Because the network uses the disclosed RPUs, the information flow is local, which facilitates repeating the building blocks and eliminates the need for routers, which can be a bottleneck that limits scalability.

FIG. 18 shows the network building block formed from RPU 820 (shown in FIG. 8). RPU 820 may be provided with any of the non-linearity profiles shown in FIGS. 7, 10C, 13A, 13B or 14.

Figure 19:
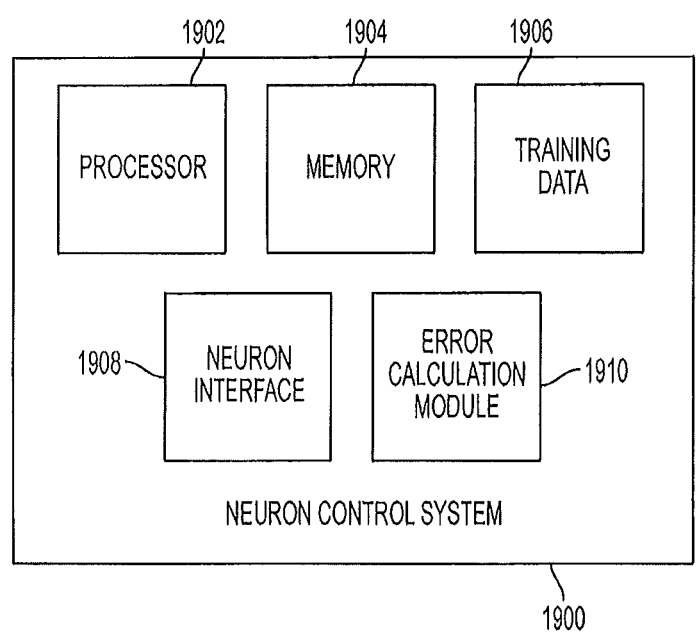
FIG. 19 depicts a block diagram of a node control system in accordance with one or more embodiments.

Referring now to FIG. 19, a node/neuron control system 1900 is shown. The neuron control system 1900 includes a hardware processor 1902 and memory 1904. Training data 1906 for an ANN is stored in the memory 1906 and is used to train weights of the ANN. A neuron interface 1908 controls neurons on the ANN, determining whether the neurons are in feed forward mode, back propagation mode, or weight update mode. The neuron interface 1908 furthermore provides inputs to input neurons and receives the output from output neurons. An error calculation module 1910 compares the outputs from the neurons to training data 1906 to determine an error signal. Neuron interface 1908 applies the error signal to the output neurons during a back propagation mode and subsequently triggers a weight update mode to train the weights of the ANN accordingly.

Figure 20:
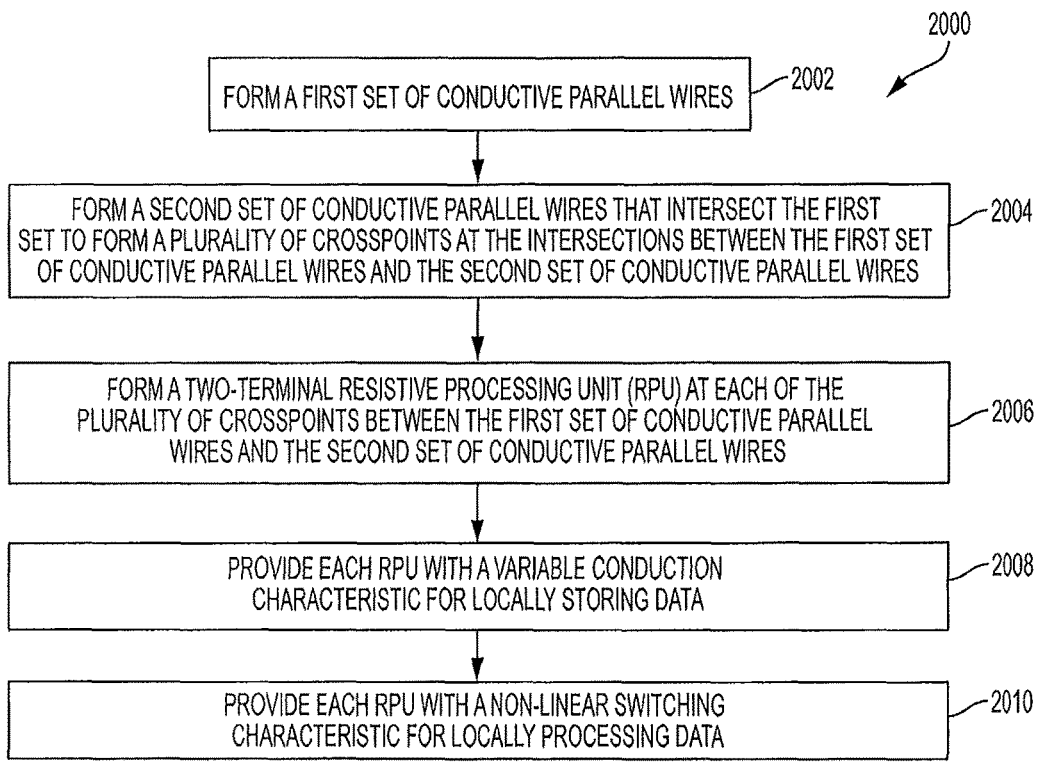
FIG. 20 depicts a flow diagram illustrating a methodology according to one or more embodiments of the present disclosure.

FIG. 20 depicts a flow diagram illustrating a methodology 2000 according to one or more embodiments. Methodology 2000 begins at block 2002 by forming a first set of conductive parallel wires. Block 2004 forms a second set of conductive parallel wires that intersect the first set to form a plurality of crosspoints at the intersections between the first set of conductive parallel wires and the second set of conductive parallel wires. Block 2006 forms a two-terminal RPU at each of the plurality of crosspoints between the first set of conductive parallel wires and the second set of conductive parallel wires. Block 2008 provides each RPU with a variable conduction characteristic for locally storing data, and block 2010 provides each RPU with a non-linear switching characteristic for locally processing data.

Figure 21:
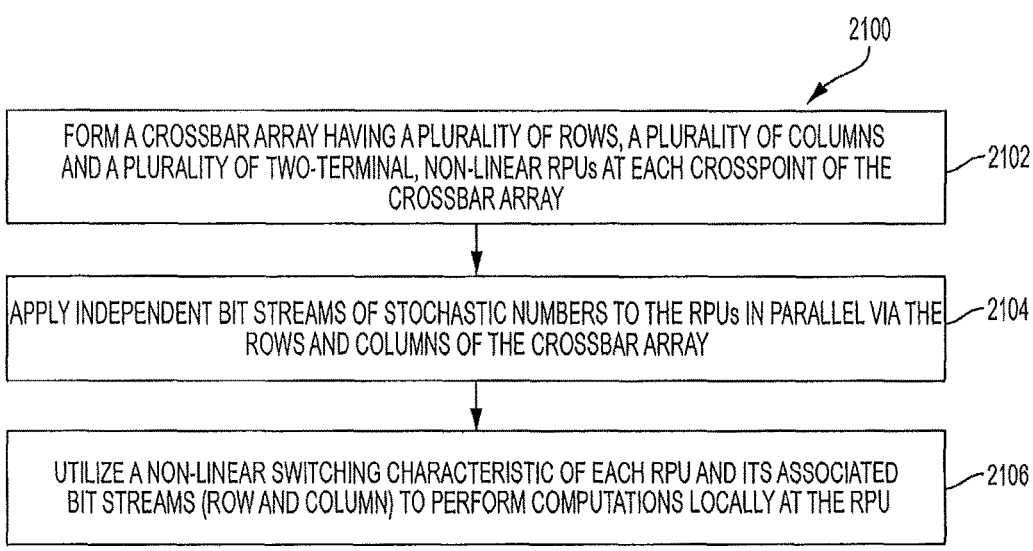
FIG. 21 depicts a flow diagram illustrating another methodology according to one or more embodiments of the present disclosure.

FIG. 21 depicts another flow diagram illustrating a methodology 2100 according to one or more embodiments. Methodology 2100 begins at block 2102 by forming a crossbar array having a plurality of rows, a plurality of columns and a plurality of two-terminal, non-linear RPUs at each crosspoint of the crossbar array. Block 2104 applies independent bit streams of stochastic numbers to the RPUs in parallel via the rows and columns of the crossbar array. Block 2106 utilizes a non-linear switching characteristic of each RPU and its associated bit streams (row and column) to perform computations locally at the RPU.

Accordingly, the present disclosure provides a number of technical benefits. A single, two-terminal device uses a non-linear switching characteristic of the device, along with encoded input bit streams to locally perform weight updates that consume low power and accelerate machine learning in ANNs formed from crossbar arrays of the non-linear RPUs. The disclosed RPU can locally perform the processing and storage steps necessary to perform forward pass matrix multiplication, backward pass matrix multiplication and weight updates. The RPU may accelerate a variety of training methodologies, including online neural network training, matrix inversion and matrix decomposition.

Parts of one or more embodiments may be a device, a system, a method and/or a computer program product. The computer program product in accordance with one or more embodiments includes a computer readable storage medium (or media) having program instructions thereon for causing a processor to carry out aspects of one or more embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method of forming a two-terminal resistive processing unit (RPU) comprising:
    forming a first terminal;
    forming a second terminal;
    forming an active region having a resistance, the resistance configured to define a weight of a neuron in a neural network according to a training methodology applied to the neural network;
    configuring the active region to effect a non-linear change in the resistance in a stochastic manner based on at least one first encoded voltage signal applied to the first terminal and at least one second encoded voltage signal applied to the second terminal; and
    configuring the active region to locally perform a data storage operation of a training methodology based at least in part on the non-linear change in the conduction state; and
    configuring the active region to locally perform a data processing operation of the training methodology based at least in part on the non-linear change in the resistance.

2. The method of claim 1, wherein the encoding of the at least one first encoded voltage signal and the at least one second encoded voltage signal comprises a stochastic sequences of pulses.

3. The method of claim 1, wherein the encoding of the at least one first encoded voltage signal and the at least one second encoded voltage signal comprises a magnitude modulation.

4. The method of claim 2, wherein the non-linear change comprises a rectifying non-linear change or a saturating non-linear change.

5. The method of claim 3, wherein the non-linear change comprises an exponential non-linear change.

6. A method of forming a trainable crossbar array comprising:
    forming a set of conductive row wires;
    forming a set of conductive column wires configured to form a plurality of crosspoints at intersections between the set of conductive row wires and the set of conductive column wires; and
    forming a two-terminal resistive processing unit (RPU) at each of the plurality of crosspoints, the RPU configured to represent a neuron in a neural network represented by the trainable crossbar array, wherein a resistance of an active region of the RPU defines a weight of the neuron;
    configuring the RPU to locally perform a data storage operation of a training methodology applied to the neural network represented by the trainable crossbar array, the data storage operation performed by a change in the resistance based on a first encoded voltage signal applied to a first terminal and a second encoded voltage signal applied to a second terminal; and
    configuring the RPU to locally perform a data processing operation of the training methodology using the changed resistance.

7. The method of claim 6, wherein:
    the data storage operation comprises a change in the resistance that is based at least in part on a result of the data processing operation; and
    the change in the resistance comprises a non-linear change based on at least one first encoded signal applied to the first terminal and at least one second encoded signal applied to the second terminal.

8. The method of claim 7 further comprising:
configuring the active region to locally perform the data storage operation of the training methodology based at least in part on the non-linear change in the resistance; and
configuring the active region to locally perform the data processing operation of the training methodology based at least in part on the non-linear change in the resistance.

9. The method of claim 6, wherein the training methodology comprises at least one of:
an online neural network training;
a matrix inversion; and
a matrix decomposition.

* * * * *